(12) United States Patent
Costas et al.

(10) Patent No.: US 9,802,676 B2
(45) Date of Patent: *Oct. 31, 2017

(54) HIGH EFFICIENCY COMPRESSOR AND DISTRIBUTION SYSTEM

(71) Applicants: Dan Nicolaus Costas, Apollo Beach, FL (US); Alexander Nicholas Costas, Apollo Beach, FL (US)

(72) Inventors: Dan Nicolaus Costas, Apollo Beach, FL (US); Alexander Nicholas Costas, Apollo Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/251,737

(22) Filed: Aug. 30, 2016

(65) Prior Publication Data

US 2017/0029073 A1 Feb. 2, 2017

Related U.S. Application Data

(63) Continuation of application No. 15/019,841, filed on Feb. 9, 2016, now Pat. No. 9,457,872.

(60) Provisional application No. 62/176,738, filed on Feb. 27, 2015.

(51) Int. Cl.
*B63B 1/38* (2006.01)
*F04F 5/04* (2006.01)
*F04F 5/44* (2006.01)
*F04D 17/16* (2006.01)
*F04F 5/46* (2006.01)

(52) U.S. Cl.
CPC ................ *B63B 1/38* (2013.01); *F04D 17/16* (2013.01); *F04F 5/04* (2013.01); *F04F 5/44* (2013.01); *F04F 5/461* (2013.01); *B63B 2001/387* (2013.01); *Y02T 70/122* (2013.01)

(58) Field of Classification Search
CPC ................. B63B 1/32; B63B 1/38; F04F 5/04
USPC ................................................ 114/67 A, 289
See application file for complete search history.

(56) References Cited

U.S. PATENT DOCUMENTS 2,378,822 A * 6/1945 Barry ...................... B63B 1/38
114/67 A
9,457,872 B2 * 10/2016 Costas ...................... B63B 1/38

* cited by examiner

*Primary Examiner* — Lars A Olson
(74) *Attorney, Agent, or Firm* — Kilpatrick Townsend & Stockton LLP

(57) ABSTRACT

This present invention is a more economical method and apparatus for compressing gas or other compressible fluids in high volumes at any desired pressures for any desired purpose. One preferred use is for generating high volumes of air capable to be delivered at any drafts for the purpose of lubricating ships motions and accordingly lowering their drag, fuel consumption and harmful emissions.

6 Claims, 6 Drawing Sheets

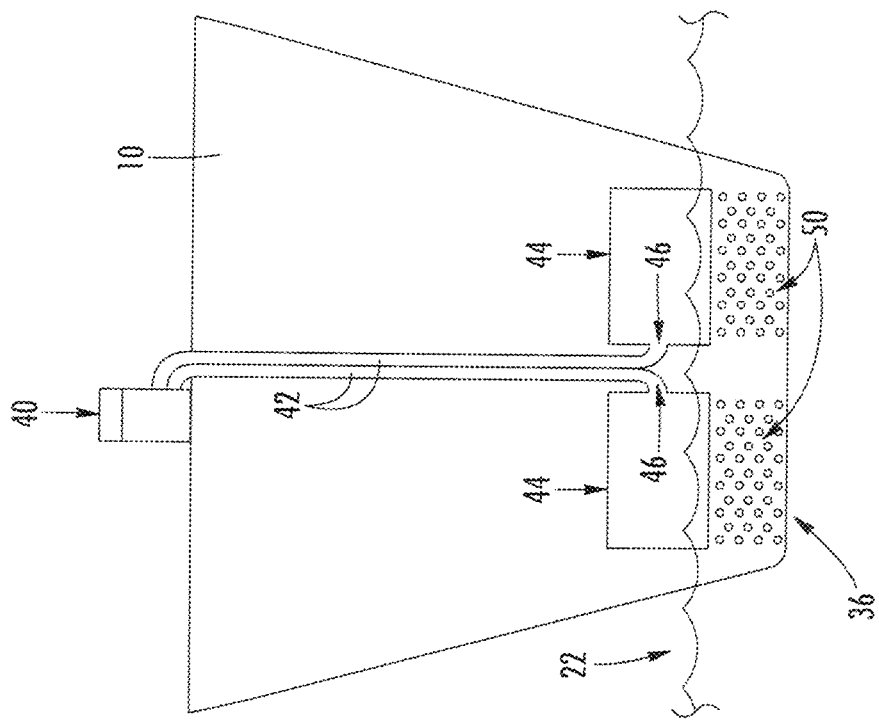
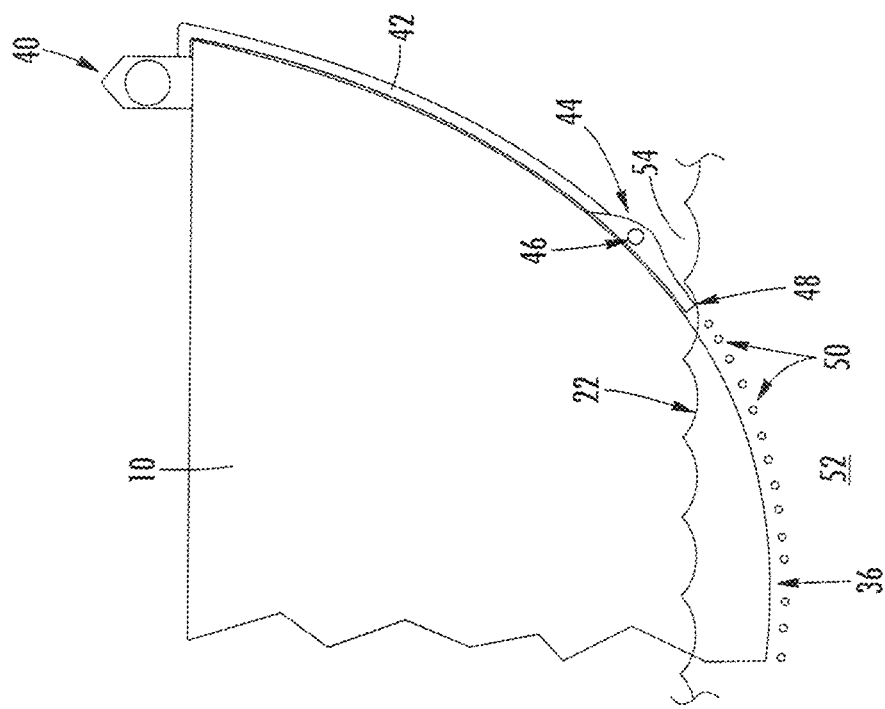

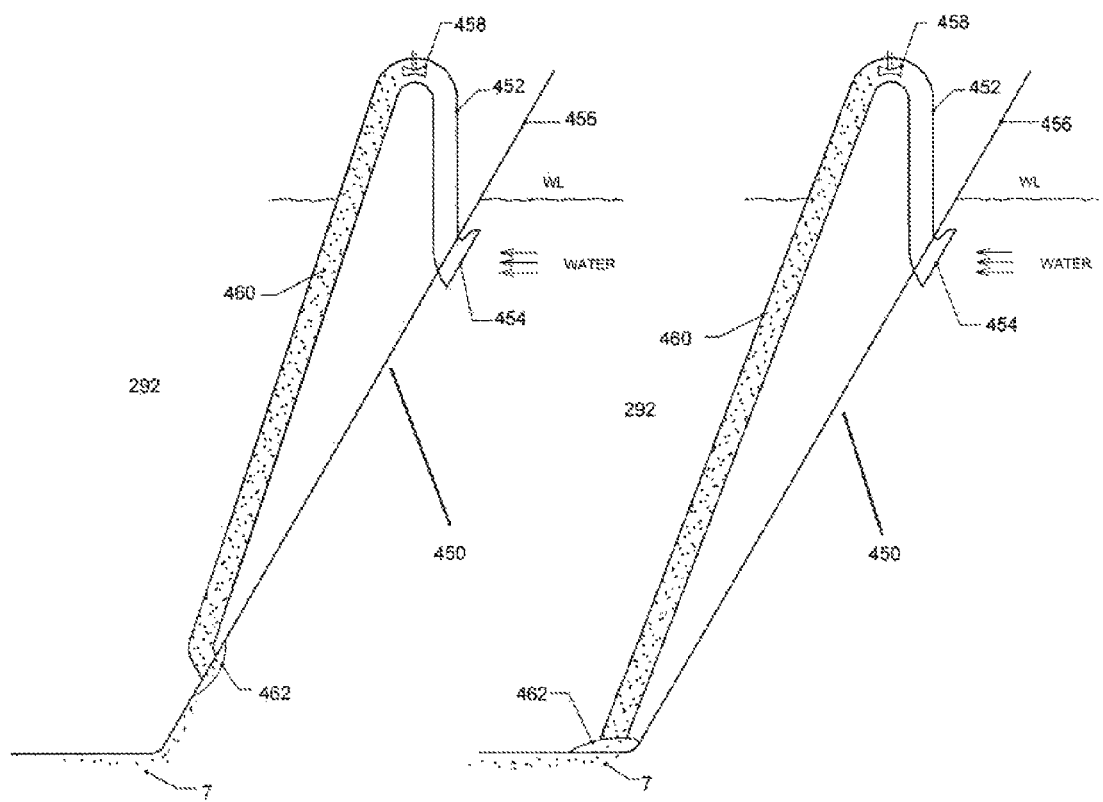

HIGH EFFICIENCY COMPRESSOR AND DISTRIBUTION SYSTEM

CROSS REFERENCE TO RELATED APPLICATIONS

This Application is a continuation-in-part of U.S. patent application Ser. No. 15/019,841 filed on Feb. 9, 2016, which takes priority from U.S. Provisional Patent Application No. 62/176,738 filed on Feb. 27, 2015, titled "High efficiency high volume low pressure compressor", by inventors Dan Nicolaus Costas and Alexander Nicholas Costas, the contents of which are expressly incorporated herein by this reference.

FIELD OF INVENTION

This invention relates to the method and apparatus for generating compressed air that can be used for various applications including air bubble generation for lubrication of nautical vessels. Vast amounts of air at various pressures depending on the depth (draft) at which the air needs to be dispersed are needed. The existing types of compressors can either deliver pressures but not economically large volumes (piston type) or large amounts but not enough pressure (turbo fans) to overcome the pressure at the high depths required by transportation ships.

BACKGROUND

90% of world transportation of goods is being done by nautical vessels. Most of it is by ocean going ships which burn a massive amounts low grade bunker fuel. This fuel is the least expensive, but most polluting petroleum product available. On an annual basis, the fifteen (15) largest transportation ships are responsible for as much pollution as the worldwide fleet of 780 million cars. The 90,000 nautical vessels over 150 meters long currently operating burn more than eighty-five (85%) percent of the oil exports of Saudi Arabia, the world's largest oil exporter, daily. It has been estimated that more than 60,000 deaths occur each year of illnesses caused by pollutants generated by maritime shipping. It is thus very important to reduce this exorbitant consumption in any possible way.

Although more efficient engines and methods to reduce their emissions are being implemented on newly built ships, the ships already in use generally will not be upgraded before being retired from service. Mitsubishi Heavy Industries has designed and is building a new type of ship using an air lubrication system termed "MALS", which reduces drag and reduces fuel consumption by about seven (7%) percent. They use powerful fans that pressurize air to be released as air bubbles under the hull and thus lower the frictional resistance. The problem is that the fans consume energy and still cannot generally push air deeper than five (5) meters. Therefore, they built a new class of vessels with shallow drafts that can employ this lubrication technology. They are flooded with orders for these new boats, but it takes time to build them and the already in use boats cannot benefit since most of the carriers have bigger drafts. A compressor that can generate large volumes of air at a pressure sufficient to overcome the static pressure at the bottom of the vessels is needed.

While the U.S. Pat. No. 8,763,547 authored by Dan Costas and Alexander Costas offers a solution for such a compressor, this compressor has to be custom built for each vessel. For this a dry dock is needed and that makes it for a long and expensive installation dramatically reducing the number of boats that can be upgraded in a year. A modular compressor that can be built, transported, and dropped on to a boat to supply compressed air for an air bubble distribution system that can also be attached on boats without need for a dry dock would be desirable because a large number of boats can be outfitted each year contributing significantly to the fuel economy and pollution reduction. While the bubble generation for ship lubrication is one of the applications, this type of compressor once proven its efficiency can be used for any other unrelated application in any market sector.

SUMMARY OF THE INVENTION

One important and very useful application would be to have a system that can be easily implemented on existing boats for reducing their drag and consequently their fuel consumption and harmful emissions. Such a system as described in the previous applications is formed by 2 parts, the air compressing part and the compressed air distribution part. The key part of such a system is a compressor capable of efficiently delivering large flows of air (hundreds to thousands of liters/second) at relatively low pressures, (1 bar above atmospheric pressure for a 10 meters draft, 2 bar for 20 meters draft etc.). Such a compressor does not exist. The existing technologies can provide either high pressure/low flow or high flow/too low pressure for reasonable/useful fuel consumptions, but consume exorbitant amounts of fuel in order to provide high flow rates at the required pressures.

The present invention describes a simple concept which with very low energy consumption compresses significant volumes of a gas to any desired pressure in a timely manner. Instead of trying to accelerate air with a propeller like turbofans do, it pumps water which is 780 times denser than air and therefore the propeller has a much better power delivery from the motor. The water is being pumped from a relatively large chamber compared to the pipes that it is being driven through, up an ascending pipe that leads to an air injector, for instance a venturi pipe. Here, due to a depression created by the water being accelerated through the injector, air is being drawn in to the flow and entrained creating a mixture of water with air bubbles which is directed through a descending pipe back to the relatively large chamber. Here, the flow slows down significantly, allowing the air to separate on top of water as compressed air due to the fact that the limited space keeps being fed air by the flow of water.

Once a circuit of water is established, its momentum and energy is conserved in this circuit between the tank, ascending and descending pipes, and the injector, thus the pump keeps recirculating the flow of water without any effort except that necessary to overcome the friction in the system besides compensating for the weight difference between the ascending heavier column of water and descending lighter column of air/water mixture. From here on, compressed air can be withdrawn from the space on top of the water in the tank which now constitutes the compressed air reservoir, while the flow of water maintained by the pump keeps replenishing the consumed air. The air/water ratio varies depending on many variables but it is significant, ranging from 20% to over 40% under normal operating conditions.

While the ship lubrication application is one of the best applications of this new type of compressor, many other applications can be envisioned and the simplicity and economic advantages of it should make it desirable.

It is the object of this invention to overcome the limitations of the prior art.

These, as well as other components, steps, features, objects, benefits and advantages, will now become clear from a review of the following detailed description of illustrative embodiments, the accompanying drawings, and the claims.

BRIEF DESCRIPTION OF THE DRAWINGS

FIG. 4. Shows a frontal view of a vessel with a simple to implement distribution system attached to the bow.

FIG. 7. Is a schematic view of an embodiment of a distribution system coupled to a nautical vessel.

FIG. 8. Is a schematic view of an embodiment of a distribution system coupled to a nautical vessel.

DETAILED DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

In the following description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the figures, and the detailed descriptions thereof, are to be regarded as illustrative in nature and not restrictive. Also, the reference or non-reference to a particular embodiment of the invention shall not be interpreted to limit the scope of the invention.

Figure 1:
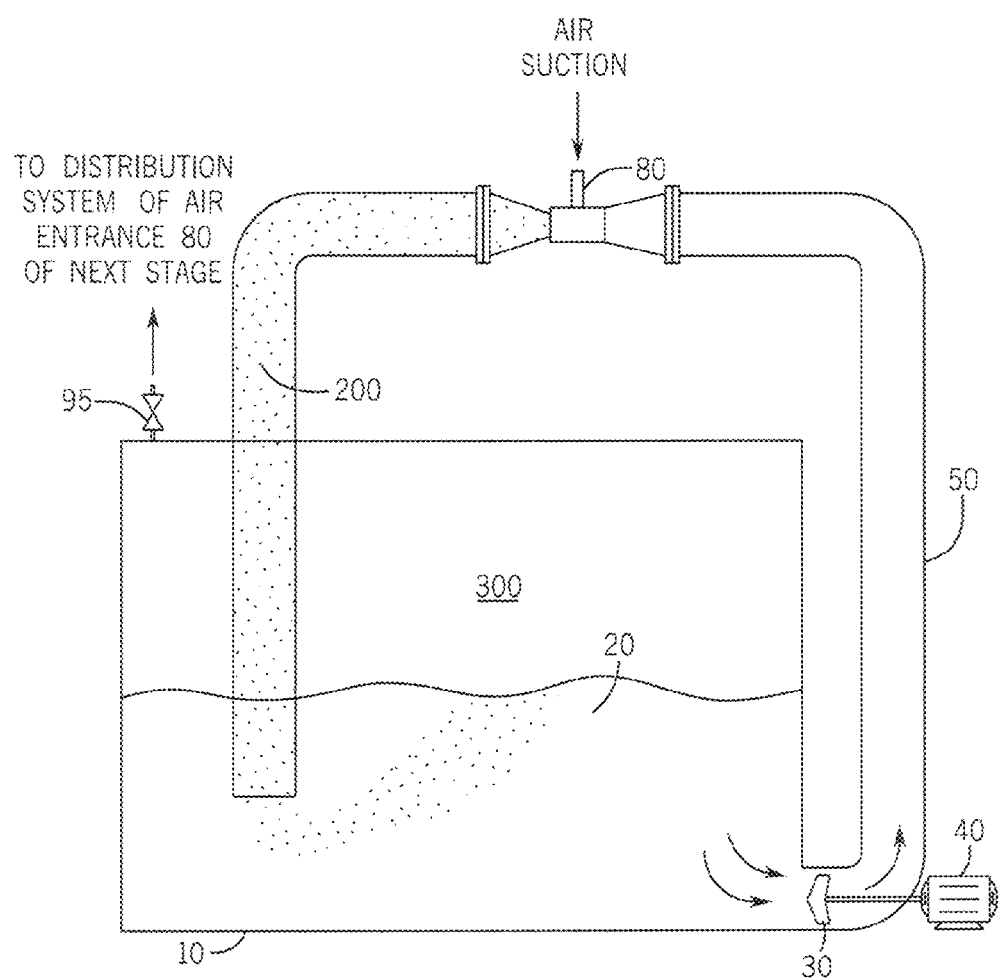
FIG. 1. shows the principle of the compressor and how it can be manufactured inside a standard 40 foot container for easy delivery FIG. 2. Shows how the compressor can be manufactured in the small scale such that it can meet the space demands of any client and be connected in stages to nevertheless deliver high pressures FIG. 3. Shows a side view of a vessel with a simple to implement distribution system attached to the bow.

FIG. 1: shows the principle of the functioning of such a compressor. A closed tank 10 holds a transport fluid 20, such as water, which can be pumped by pump impeller 30 actuated by motor 40 into pipe 50 which connects with a fluid injector 60—for example a venturi tube—drawing a second, compressible fluid 200—for example atmospheric air and/or another gas—through pipe 80 from a source of said second compressible fluid 200 that in most cases is the atmospheric pressure. The colloid 70 formed of transport fluid 20 and compressible fluid 200 gets returned to tank 10 where the speed of the colloid 70 decreases to the point that the compressible fluid 200 raises to the surface forming a reservoir 300 of compressed fluid 200. The compressed fluid 200 in reservoir 300 can supply through valve 95 the necessary pressure for a boat lubrication system using air bubbles or be used for any other purpose requiring compressed air as well as cover for additional energy needs of the ship.

While the compressed air and the heat generated by this system can be used for any purpose, the particular application of lubricating the motion of vessels will be detailed further.

The tank 10 together with pump 30 and motor 40 can be installed in a 40 foot transport container which has the advantage of being easily transported and loaded on boats. The ascending pipe 50, compressible fluid injector 60 and descending colloid pipe(s) can be affixed on top of the tank-container. To increase the efficiency and volume of compressible fluid injection it is preferable to have low static pressure and therefore the injector 60 can be lifted to be working at ten meters for example, above the water level in tank 10. This way for as long as the pump 30 keeps moving water, the system keeps supplying the necessary air to be delivered at a depth of 10 meters through the distribution system (not shown) connected to valve 95. The 10 meter high pipe and venturi system can be held up by various means, including pole with anchors or posed against existing walls or other structures not shown.

This system is very flexible with regards to implementation. Referring to FIG. 1: it is possible to modulate the levels of compressible fluid 200 flow and pressure increase by:

modulating the pressure difference created in the compressible fluid injector 60 by altering its dimensions or actively injecting compressible fluid 200 and/or altering the dimensions of pipes 50 and/or altering the dimensions of tank 10 and/or altering the power delivery of motor 40 and/or altering the size or design of pump 30 and/or altering the height H of the venturi pipe with respect to the fluid level in separation tank 10.

All of these modifications are based upon the Bernoulli principle with aim of changing transport fluid velocity, pressure gains or drops in various parts of the system, and total flow rate of compressed fluid. As such this system is apt to generate a wide range of pressures and flow rates, at will, with the deciding factors being those presented by the installation at hand. How and why these effects happen is detailed in following paragraphs.

To illustrate the point further, will briefly introduce the Bernoulli principle and formulae thereof and show how each of the above modifications would lead to its desired effect. The Bernoulli principle states that the total energy of a fluid in a pipeline is constant, that is, that the relative proportions of kinetic, potential, and pressure energy can change along a pipeline, but that their sum does not.

A nice way to introduce the formulae we need is to start with a description of the energy of a set amount of water in the pipeline, which is conserved thanks to the first law of thermodynamics, and then move on from there.

Such an expression would be: $\frac{1}{2}mv^2 + PV + mgz = K$

Where m is the mass of fluid in question, v is its velocity, P is its static pressure, V is its volume, g is acceleration under earth's gravity, z is its elevation above a set level, and K is some constant. In this formula we easily recognize the term for kinetic energy, $\frac{1}{2}mv^2$, the term for pressure-volume energy, PV, and the term for potential (elevation) energy, mgz.

Moving forward we can divide by the volume to obtain a more useful equation: $\frac{1}{2}\rho v^2+P+\rho gz=K$ where $$\rho = \frac{m}{V}$$

is the density of the fluid and the other terms are the same (note K is an arbitrary constant, not necessarily the same as before). This may be familiar in another form as the formula for the total head $$H = \frac{v^2}{2g} + \frac{P}{\rho g} + z$$

which is obtained by dividing the previous equation by $\rho g$.

Let us work with $\frac{1}{2}\rho v^2+P+\rho gz=K$ which provides us with the dynamic pressure, $\frac{1}{2}\rho v^2$, static pressure P, and the third component $\rho gz$ which will be termed "potential pressure" for the rest of this patent since it is a representative of the potential energy and has the potential to be converted in to static or dynamic pressure. A typical transport fluid 20 would be water which is practically incompressible, meaning that its density $\rho$ is also constant, since neither the mass nor the volume of a sample of water can be changed. This leaves the variables v, P, and z to be altered (g is a natural constant on earth's surface). Luckily we have full control of v and z by controlling the pump 30 and motor 40 driving the transport fluid, the diameter of the pipes 50 being used, and the elevation of said pipes 50 (note $$v = \frac{Q}{A} \text{ where } A = \left(\frac{d}{2}\right)^2 * \pi,$$

Q being the flow of transport fluid supplied by the pump. A the cross section of a pipe, and d being the diameter of a pipe). This means we can control the static pressure in any point of the system by designing it to have a certain fluid velocity v and elevation z at that point, and hence have a low pressure system in the compressible fluid injector 60 to draw compressible fluid from its source, and a high pressure system in the tank 10 and thus a high pressure in the compressible fluid reservoir 300.

Let us apply this knowledge to the aforementioned points of flexibility in the system:

modulating the pressure difference created in the compressible fluid injector 60 by altering its dimensions is controlling the velocity in said injector 60 such that the static pressure is below that of the source of compressible fluid 200 (static pressure falls if dynamic pressure increases due to a velocity increase since total pressure/head/energy is constant) such that it will suck from that source and actively injecting compressible fluid 200 is simply increasing the pressure of the source of compressible fluid 200 such that it is above the pressure of the transport fluid 20 in the injector 60.

Altering the dimensions of pipes 50 is simply controlling the velocity in these pipes 50 and thus the dynamic pressure, which again controls the static pressure indirectly through Bernoulli's principle. In practice this is more closely connected to the flow of transport fluid 20 which is related to the injection rate.

Altering the dimensions of tank 10 again controls the speed of the transport fluid 20 in the tank, and by making the tank 10 have a much larger cross section than the pipes 50 the transport fluid 20 slows down to a near stop and thus most of the energy will be stored as pressure—high pressure.

Altering the power delivery of motor 40 modulates the flow Q of transport fluid 20 provided to the system and thus the velocity, and hence pressure, differences possible between the injector 60 and the tank 10. E.g. a higher flow rate will have a much higher dynamic pressure and hence much lower static pressure in the injector 60 while the pressure in tank 10 would be otherwise unchanged as the transport fluid 20 is in near standstill there anyway. This allows continued compression to higher tank 10 pressures since it will take longer for the static pressure in injector 60 to build up and equalize the source pressure of compressible fluid 200.

Altering the size or design of pump 30 again has the same effect as point (4) in that you are selecting the correct design of the pump for the water speed intended—large centrifugal propellers for high water speeds for example. This is quite a relevant point in that most conventional pumps are designed to continuously accelerate fresh fluid rather than maintain a set speed on a closed circuit, and are thus designed to deliver much more torque than necessary once the system is under way, and not enough rotations per minute on a propeller that is too small, i.e. the system is "stuck in first gear".

Altering the height displacement H of the transport fluid level in tank 10 to injector 40 is the manipulation of the part of Bernoulli's principle that we have left thus far untouched: the potential (elevation) pressure. Obviously at a set speed raising the injector 60 further above the tank 10 will consequently lower the static pressure in injector 60 since the potential pressure is increasing while dynamic pressure is unchanged (in the same way that static pressure is lowered by increasing dynamic pressure at a set elevation).

Thus the flexibility of this device and its usefulness has been demonstrated. It is clear as well that any standard practices that may be put in place (such as having a large displacement H by securing the device to the walls of a building to generate large tank 10 pressures rather than consuming a lot of fuel to power a strong pump/motor combination 30/40 to achieve the equivalent resulting tank 10 pressure) are a matter of convenience and space allocation for specific installations rather than rigid necessities.

Having discussed the matter of pressure generation it is natural to now discuss how much flow of compressed fluid 200 is generated by this system. This is simply answered since all standard injection systems have empirical tables listing their injection rates at varying pressures and fluid speeds (often, as in the case of venturi pipes, listed as the inlet and outlet pressure when the injector is connected in parallel to the main flow rather than in line with it for technical reasons), which are both under the control of the designer of any set device. It is thus clear that an appropriate flow rate can be attained for the intended use by intelligent engineering. Any new injection devices will obviously develop their own empirical findings for injection rates but this is not the subject of the current patent.

Practically the compressor is comprised of 4 distinctive parts: a. The pump, b. the air injector, c. the separation/compression chamber and d. the plumbing between them as shown in FIG. 2.

Figure 2:
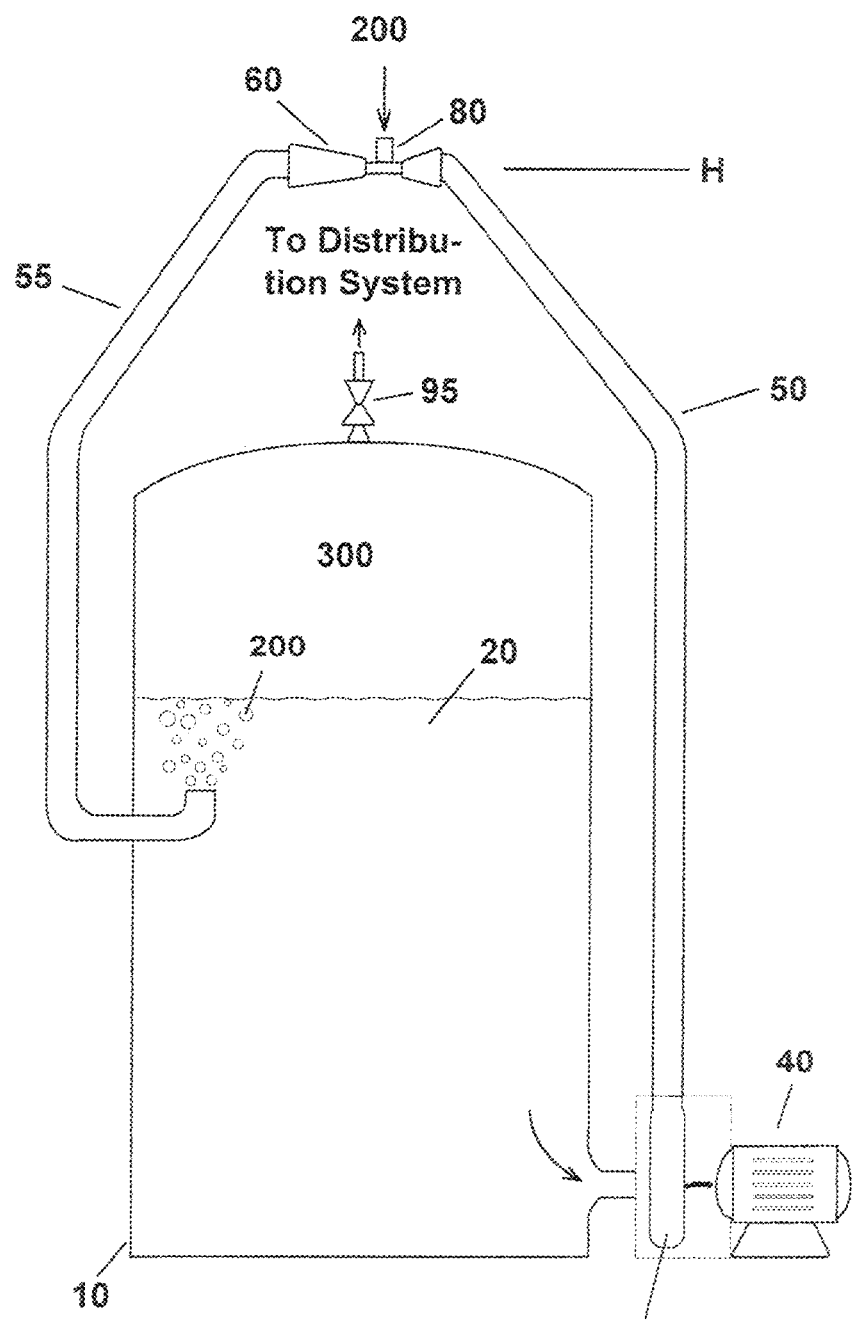

FIG. 2: While in FIG. 1 a large, container size separation chamber is shown, with an axial type pump that delivers most efficiently high flows of fluid at low heads. If there are space constraints that do not allow such a large installation, a smaller one may be designed as per previous flexibility observations although it will be less economical. In such a system a centrifugal pump 30 capable of delivering higher dynamic pressure may be employed such that the plumbing 50 joining pump 30 with injector 60 and separation chamber 10 can be accommodated in smaller spaces. The pump actuating motor should preferably be an electric motor 40 with the proper automation to adjust its speed and power consumption as needed. As it was mentioned, by increasing the height H of the injector from the liquid surface in the separation chamber 10, the maximum pressure in this chamber 10 can be increased as desired.

However if the height H becomes practically impossible to accommodate, the compressor can be built in more than one stage. While the original compressor shown will constitute the first stage, adding another compressor as a stage 2 that takes the gas input 200 to its gas injector 60 from the compressed gas valve 95 of the stage 1 compressor will accomplish the task. Similarly stage 3 will operate with compressed air from stage 2 and so on. The characteristics of each of the compressors of each stage will be adapted for each of them accordingly for maximum efficiency.

In this concluding technical paragraph the advantages of this compressor with respect to the conventional piston and centrifugal compressors will be detailed. Both of these conventional compressors must operate against a pressure differential from their inlet to their outlet which would accelerate the compressed air in the opposite direction of the compressors sense of flow if the compressors are turned off. That is to say, a significant amount of power is needed simply to counteract this backflow tendency of the compressed air, to the point that these conventional compressors have a cap in their pressure differential at which point they will be using all of their power to simply maintain the gradient that they have established. Centrifugal compressors opt for high volumes of compressed air while only allowing for relatively low maximum pressures, whereas piston compressors can achieve higher pressures but sacrifice flow rate. The subject device of this patent does not have this issue as (drawing from FIG. 1) the pump 30 is pumping transport fluid 20 across a zero gradient, and must only supply the power to compress the compressible fluid 200 and compensate for velocity losses of transport fluid 20 due to friction in the closed circuit, and not the additional gradient suppression power required by the conventional counterparts. Concisely: this new device will consume much less power to compress fluid 200 or maintain a set pressure differential between tank 10 and source of fluid 200 than the conventional compressors. This is easily accepted when one notices that the source of fluid 200 and reservoir 300 of compressed fluid 200 are not in linear contact with one another through the driving pump 30, whereas this is the case in conventional compressors. As such, this constitutes a significant improvement to the previous state of the art.

FIG. 3 and FIG. 4 show a preferred distribution system for compressed air for ship lubrication. The CFD (Computational Fluid Dynamics) show that from a certain level 48 close to the ship bottom 36 the flow lines of water will end up under the hull bottom 36. Therefore if compressed air is being released by air distributor 44 at that level the air bubbles 50 will end up under the hull bottom 36 as shown. If the surrounding water level 22 is close to that level, its static pressure is low and the lubrication can be attained with an inexpensive, low power blower.

The higher the water level 22 is relative to the compressed air releasing point of distributor 44 the higher the water static pressure that needs to be overcome and more powerful source of compressed air is needed. Since most vessels travel loaded, a corresponding source of compressed air capable to overcome the static water pressure at the highest drafts is needed.

However, the proposed distribution system has a few distinct advantages over the holes in the bottom of the ship practiced by ship lubrication providers like MHI. The first advantage is the fact that the bubbles are being released at higher level than the ship bottom and therefore lower pressures and power consumption are needed. The source of compressed air 40 as well as the leading piping system 42 to the air distributor 44 can be affixed on the exterior of the bow or installed anywhere on a ship as desired without even the need of a dry dock since the ship can be ballasted with the bow exposed during the installation. While on newly built ships this is not such an important factor, for updating ships already in use which form the bulk of the market the ease of implementation is a must.

Figure 5:
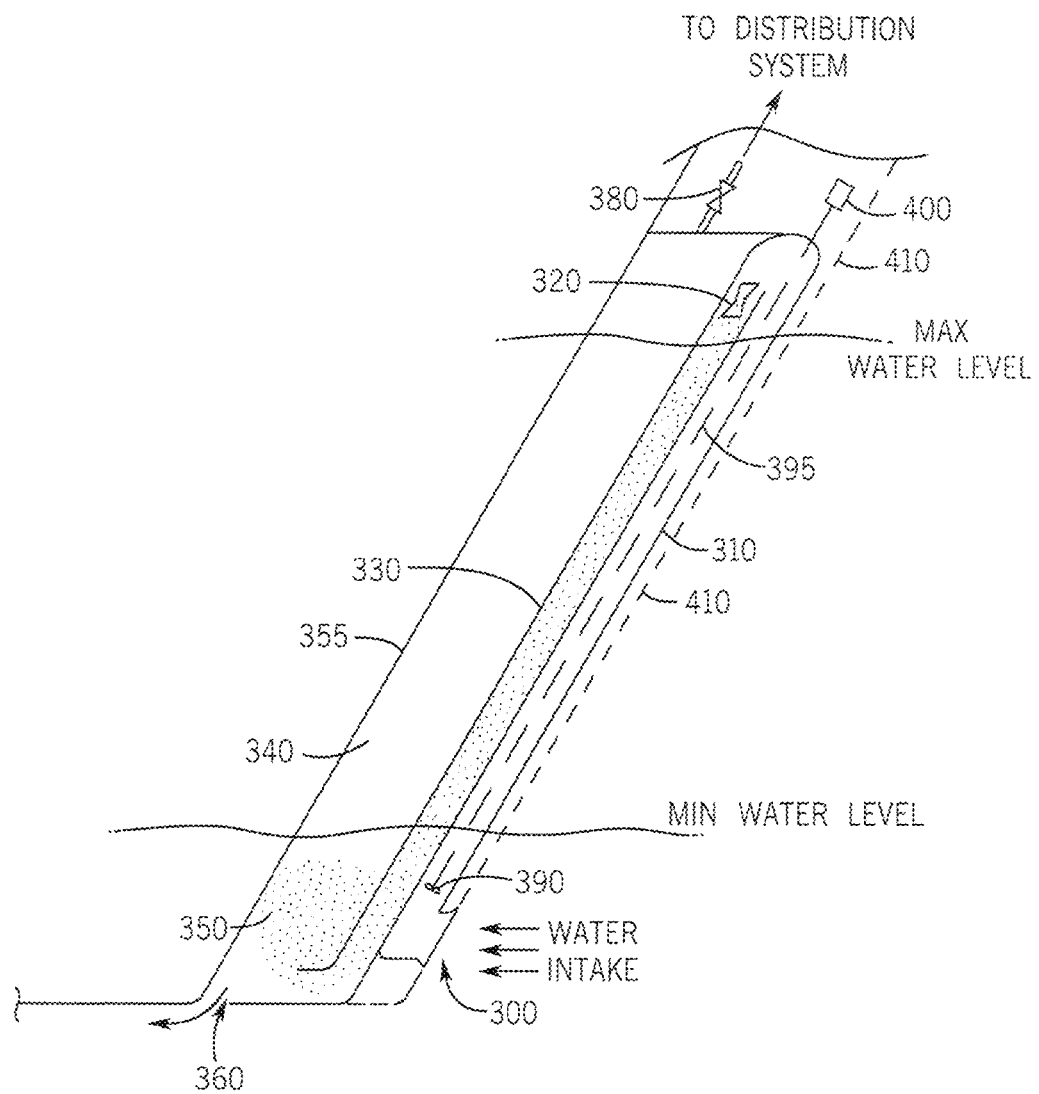
FIG. 5. Shows a version of the compressor designed to be attached to the bow of an existing ship to generate the needed air to be used for the lubrication as well as other ship needs.

FIG. 5 Shows an adapted version of this compressor that can be attached to the bow of a vessel to generate the compressed air necessary for its lubrication and/or other energy needs. As the ship sails, water at water intake 300 situated under the minimum draft water level is being absorbed and guided upwards the ascending channel 310 and diverted into the venturi 320 elevated above the highest maximum water level for achieving low static pressure. The venturi 320 will entrain significant amounts of air generating a descending air/water columns 330 which gets driven down by dynamic pressure to the bottom level of separation chamber 335 from where the slowed down water leaves through exit 360 while air separates on top as compressed air 340 to be distributed to the distribution system not shown through valve 380. To be noticed that in many situations as would be the case with fixed draft and higher speed ships like ferryboats or cruisers the dynamic pressure of the sailing boat may be enough to generate the necessary compressed air. For variable draft carriers the dynamic pressure may need to be supplemented as needed by single or multistage pump 390 actuated by motor 400 through shaft 395. A shield 410 may be installed to protect and give the ship its original bow form, or part or the whole compressor system can be accommodated inside the original hull as shown. This economic system can easily be attached to ships already built to save significant fuel and pollution as well as on new builds.

Figure 6:
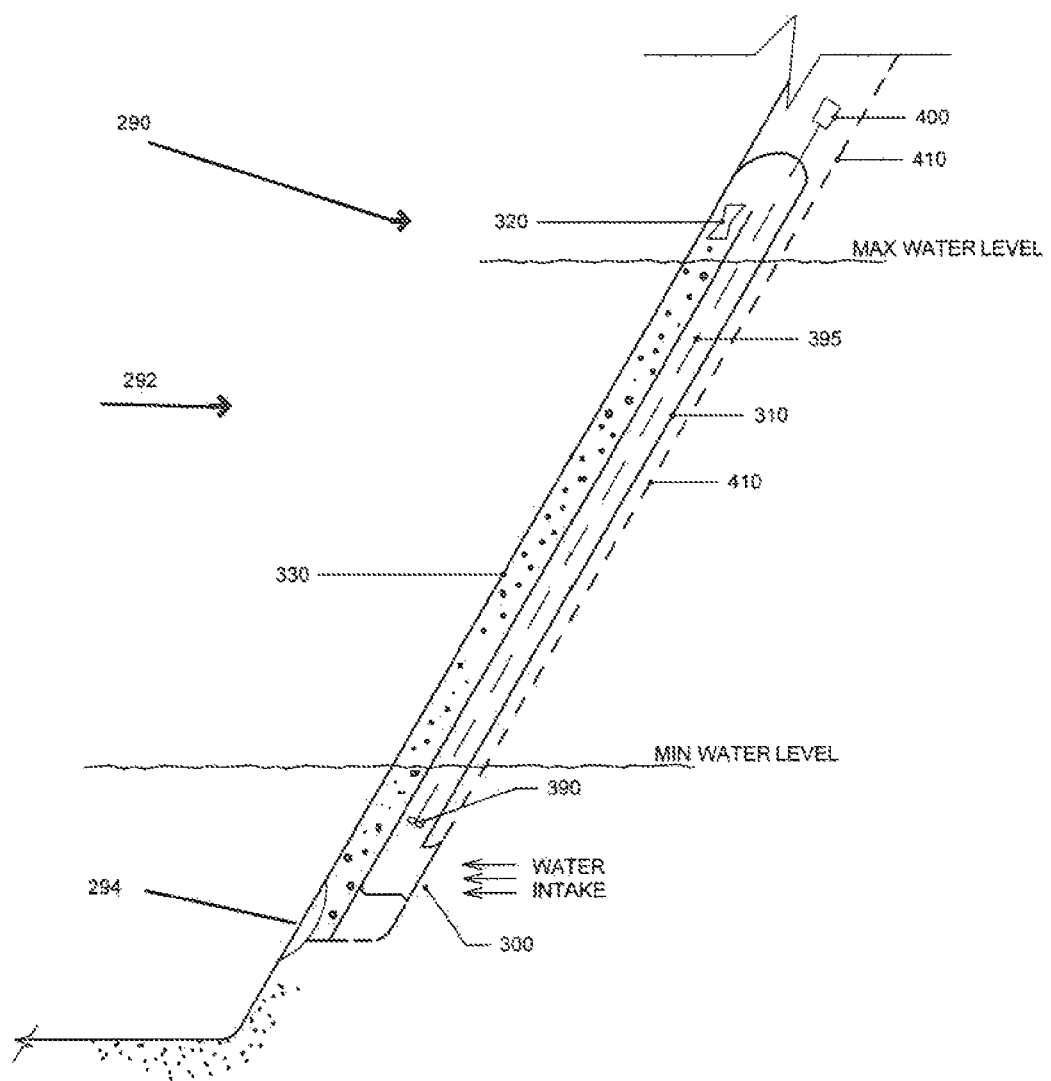
FIG. 6. Is a schematic view of an embodiment of a distribution system coupled to a nautical vessel.

FIG. 6 is a schematic view of an embodiment of a distribution system 290 coupled to a nautical vessel 292. As explained above, the distribution system 290 is an adapted version of a compressor that can be attached to the bow of a vessel 292 to generate compressed air. The compressed air is then released through a spreader/distributor 294 (e.g., conduit/pipe with a single outlet, a conduit/pipe with multiple outlets, etc.) to lubricate the vessel while sailing. In operation, water (e.g., transport fluid, carrier fluid) enters the water intake 300 positioned under the vessel's minimum draft when sailing. The water is then guided upwards through the ascending channel 310 (e.g., pipe, conduit) and into a venturi valve 320 (e.g., compressible fluid injector), which is elevated above the maximum draft of the vessel 292 to minimize static pressure. As water passes through the venture 320, the dynamic pressure of the water entrains air. The air/water mixture is then driven by dynamic pressure through the descending air/water column(s) 330 (e.g., conduit(s), pipe(s)) to the spreader 294 where the air/water mixture is released. The air bubbles then pass along and/or underneath the vessel 292, which lubricates the vessel 292 (i.e., reduces friction between the vessel 292 and the surrounding water) while sailing. As illustrated, the spreader 294 couples to the bow of the vessel 292, but may also couple to the starboard side, the keel, or the port side of the vessel 292. In some embodiments, there may be multiple spreaders 294 that couple to the starboard side, the keel, and/or the port side of the vessel 292.

In some embodiments, the distribution system 290 may use a blower (e.g., low-power blower) instead of the venturi valve 320 to inject air in the water. In still other embodiments, the distribution system 290 may use a venturi valve 320 and a blower to entrain air in the water. For example, one or more blowers may be placed upstream and/or downstream of the venturi valve 320 to inject air into the water.

As illustrated, the distribution system 290 may include a pump 290 (e.g., single stage, multi-stage pump) that supplements the dynamic pressure of the water generated as the vessel 292 moves through the water. For example, variable draft carriers may include the pump 290 to pump water through the distribution system 290 to supplement the dynamic pressure. Furthermore, the distribution system 290 may be retrofitted to existing vessels 292 or built into new ships. For vessels 292 retrofitted with the distribution system 290, a shield 410 may be installed to protect and give the ship its original bow form. In other embodiments, some or part or the distribution system may be placed within the vessel 292 (e.g., the conduits 310 and 330).

FIG. 7 is a schematic view of an embodiment of a distribution system 450 coupled to a nautical vessel 292. The distribution system 450 includes one or more conduits 452 that receive water surrounding the vessel 292. The conduit 452 receives water through an inlet 454 positioned on the bow 456 of the ship that rests under the vessel's minimum draft when sailing. After passing through the inlet or intake 454, the water is directed to a venturi valve 458. In the venturi valve 458 the dynamic pressure of the water entrains air (e.g., sucks or draws air into the water). In some embodiments, the venturi valve 458 may be above a maximum draft of the vessel 292 to minimize static pressure. By minimizing static pressure, the venturi valve 458 may more easily entrain air in the water. In some embodiments, the distribution system 450 may use a blower (e.g., low-power blower) instead of the venturi valve 458 to inject air in the water. In still other embodiments, the distribution system 450 may use a venturi valve 458 and a blower to entrain air in the water. For example, one or more blowers may be placed upstream and/or downstream of the venturi valve 458 to inject air into the water.

After passing through the venturi 458, the conduit 452 guides the air/water mixture 458 to a spreader 462 positioned below the water level surrounding the vessel 492. As illustrated, the spreader 462 is positioned on the bow 456 below the water level and near the bottom of the vessel 292. In some embodiments, the spreader 462 may be positioned on the bow 456 at the bottom of the vessel 292. As illustrated in FIG. 8, the spreader 462 may also be positioned at the bottom or keel of the vessel 292. The spreader 462 includes one or more outlets that release the air/water mixture 460 into the water surrounding the vessel 292. Once released the air forms a lubricating layer between the water and the vessel 292 that reduces friction, which in turn reduces energy consumption by the vessel 292 while sailing.

Unless otherwise stated, all measurements, values, ratings, positions, magnitudes, sizes, locations, and other specifications which are set forth in this specification, including in the claims which follow, are approximate, not exact. They are intended to have a reasonable range which is consistent with the functions to which they relate and with what is customary in the art to which they pertain.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A system, comprising:
    a fluid intake configured to intake a transport fluid from a fluid surrounding a nautical vessel;
    a compressible fluid injector fluidly coupled to the fluid intake, wherein the compressible fluid injector entrains and/or injects a compressible fluid into the transport fluid; and
    a distributor coupled to an exterior surface of the nautical vessel,
    wherein the distributor is positioned below a water surface surrounding the nautical vessel and configured to release the compressible fluid between the nautical vessel and the fluid surrounding the nautical vessel to reduce friction as the nautical vessel moves through the fluid.

2. The system of claim 1, comprising a pump fluidly coupled to the fluid intake and configured to augment a flow of the transport fluid through the compressible fluid injector.

3. The system of claim 1, comprising a conduit fluidly coupled to the fluid intake and to the distributor, wherein the conduit is within the nautical vessel.

4. The system of claim 1, wherein the compressible fluid injector is placed above a maximum draft of the nautical vessel to reduce static pressure during entrainment of the compressible fluid with the transport fluid.

5. The system of claim 1, wherein the compressible fluid injector comprises a venturi valve.

6. The system of claim 1, wherein the compressible fluid injector comprises a blower.

* * * * *